United States Patent [19]

Jenney et al.

[11] Patent Number: 5,897,607

[45] Date of Patent: Apr. 27, 1999

[54] AUTOMATIC METER READING SYSTEM

[75] Inventors: William P. Jenney, Elma; Lawrence G. Szydlowski, Cheektowaga; Richard D. Ferguson, Williamsville; Carl A. Potaczala, Buffalo, all of N.Y.

[73] Assignee: Jenney Systems Associates, Ltd., Buffalo, N.Y.

[21] Appl. No.: 08/807,235

[22] Filed: Feb. 28, 1997

[51] Int. Cl.$^6$ .................................................. G06F 17/640
[52] U.S. Cl. ........................................ 702/62; 395/200.5
[58] Field of Search .................................... 364/480, 481, 364/483, 550, 552, 554; 340/870.01, 870.02, 870.03, 870.11; 379/106.01, 106.03, 106.04, 106.07; 702/57, 60, 61, 62; 395/200.3, 200.5, 200.68

[56] References Cited

U.S. PATENT DOCUMENTS

| | | |
|---|---|---|
| 3,098,123 | 7/1963 | Stonor . |
| 4,004,097 | 1/1977 | Spaulding . |
| 4,614,945 | 9/1986 | Brunius et al. . |
| 4,799,059 | 1/1989 | Grindahl et al. . |
| 4,804,957 | 2/1989 | Selph et al. . |
| 4,811,011 | 3/1989 | Sollinger . |
| 4,817,131 | 3/1989 | Thornborough et al. . |
| 4,833,618 | 5/1989 | Verma et al. . |
| 5,025,470 | 6/1991 | Thornborough et al. . |
| 5,031,209 | 7/1991 | Thornborough et al. . |
| 5,179,376 | 1/1993 | Pomatto . |
| 5,239,575 | 8/1993 | White et al. . |
| 5,311,581 | 5/1994 | Merriam et al. . |
| 5,381,462 | 1/1995 | Larson et al. . |
| 5,408,523 | 4/1995 | McEachern et al. . |
| 5,451,938 | 9/1995 | Brennan . |
| 5,452,343 | 9/1995 | Garland et al. .................... 379/109.09 |
| 5,459,459 | 10/1995 | Lee . |
| 5,469,365 | 11/1995 | Dickerna et al. . |
| 5,477,216 | 12/1995 | Lee et al. . |
| 5,528,507 | 6/1996 | McNamara et al. . |
| 5,590,179 | 12/1996 | Shincovich et al. ............... 379/106.06 |

OTHER PUBLICATIONS

Publication: Sally Hunt and Graham Shuttleworth, *Unlocking the Grid*, IEEE Spectrum 33:7, Jul. 1996.
Komor, Paul. "Online Energy Services for Commercial Energy Users." *E. Source, Inc.*, May 1996.
Not Attributed, KN Energy to Conduct AMR Trial, Worldwide Energy, Nov. 01, 1996, v7, #11.
Not Attributed, Whisper Comm Inc. . . . , Business Wire Jan. 27, 1997, p. 1270004.
Diablo Research Company Press Release, unattributed, KN Energy to Use Diablo Research's Whisper Two–Way Radio Link for AMR Trial in Scottsbluff, Nebraska, Sep. 9, 1996.
Metretek Press Release, unattributed, Metretek and CellNet Announce Alliance, Feb. 25,1997.
Info World Magazine v18 n6 p46(1), Yvonne L. Lee, LapLink Leapfrogs FTP with Own Protocols to Transfer Files, Feb. 5, 1996.
PCWeek v13 n4 p63(2), Jim Rapoza, Access Networks With Norton pcAnywhere32, Jan. 29, 1996.

*Primary Examiner*—John Barlow
*Assistant Examiner*—Craig Steven Miller
*Attorney, Agent, or Firm*—Simpson, Simpson & Snyder

[57] ABSTRACT

A method and apparatus for measuring use of a commodity and for transmitting the measurement over a global computer information network to a remote location. The apparatus comprises a data acquisition and reporting device and an automatic meter reading device operatively arranged to measure use of a commodity and transmit the measurement over a global information network to the data acquisition and reporting device.

11 Claims, 6 Drawing Sheets

Microfiche Appendix Included
(1 Microfiche, 90 Pages)

AUTOMATIC METER READING SYSTEM

In accordance with 37 CFR §1.96, a microfiche appendix is to be considered a portion of the entire "written description" of this invention in conformance with 35 USC §112. The appendix includes one microfiche having 90 frames.

FIELD OF THE INVENTION

The invention relates generally to remote automatic communication systems and, more particularly, to a method and apparatus for measuring use of a commodity and for transmitting the measurement over a global computer information network to a remote location.

BACKGROUND OF THE INVENTION

Electric power restructuring began in the United States in 1978 with enactment of the Public Utility Regulatory Policy Act (PURPA). PURPA established competition in power generation, forcing utilities to purchase power from independent generators at prices equal to their "avoided costs." Independent power producers flourished and by 1993 more than 50% of all new generation plants were by independents, dispelling the notion that economies of scale necessitated a natural monopoly on electricity generation by utilities. Restructuring continued in the United States with enactment of the Energy Policy Act of 1992, which permits wholesale customers a choice of suppliers and requires utilities to transport power across their grids to accomplish this ("wheeling"). Although the 1992 Act prohibits federal mandating of retail wheeling, it allows states to permit this, and many states are considering doing so. Sally Hunt and Graham Shuttleworth, *Unlocking the Grid*, IEEE Spectrum 33:7, July 1996, p. 20.

It is envisioned then, that deregulation will likely enable utilities and power brokers to buy and sell electricity at real-time rates determined by supply and demand, much like other commodities. In order for this to occur, however, technology must be able to measure and communicate energy usage on a real-time basis Historically, utility companies have used meter reading personnel to literally read and record the consumed commodity information provided by utility meters (i.e., gas, water, electricity and the like). However, in recent years significant strides have been made in the deployment of fully Automatic Meter Reading (AMR) systems.

Most remote meter reading systems have similarities in their designs. Generally, they comprise three major subsystems: (1) some type of encoder device physically attached to a meter and electronically connected to an end device (AMR) to give an indication of the meter reading, (2) means for storing the meter reading indicated, usually a dedicated microcontroller, and (3) means for transmitting meter data over a communication link to a central station. Various types of communication links have been used to transfer the meter data from the individual end devices to the central station:

Wireless

One wireless system utilized a mobile van carrying a radio transmitter for interrogating meter-reading end devices which include transponders. The interrogated radio transponders would then return messages to the van, which messages include meter identification and readings. Another system is based upon technology similar to that of cellular phones; radio transponders are installed throughout the metropolitan area in order to relay such messages to and from the end devices.

Because of the need for large investments in infrastructure, these wireless systems are not feasible for servicing customers who are widely separated; examples are members of multiple competing "power pools" formed by emerging enterprises called "aggregators" to achieve economies of scale in their purchase of utility commodities.

Wired via Power Line Carrier

There exist arrangements in which the power lines of the subscriber and the electric utility company are used as the link between the customer's meter and the central station. One such arrangement is described in U.S. Pat. No. 4,135,181, comprising a central station which includes a computer with input-output equipment for the multiplex generation of commands and the multiplex receipt of data over a plurality of communication lines. The system also includes an end device located at each customer residence. Each end device is connected to the power line, and receives commands from and transmits messages to the control unit over the connecting power line. Each end device is capable of selectively communicating with a plurality of utility meter encoders for reading a plurality of meters and for selectively driving a plurality of loads at a customer residence.

Although power line carrier networks are useful for reaching customers within a geographically constrained area (e.g., metropolitan), they are not feasible for reaching customers arbitrarily located across a continent, or around the world.

Wired via Telephone

Using telephone lines for automatic reporting of meter and status data is well known. In some of these systems, an interrogation signal is sent from a central receiving station to an end device (reporting station) in order to initiate the transmission of a report, the end device being either located at a telephone exchange or being connected through a telephone line thereto. Such systems may involve ringing of the customer's telephone or the installation of special ring-suppression equipment at the customer's facility or, alternatively, special equipment at the telephone exchange.

In another type of system, an end device initiates the transmission of a report. For example, U.S. Pat. No. 3,098,13 (Stonor) discloses a system in which a pulse-dialing operation is automatically performed, followed by the transmission of a message to report the condition at the end device. U.S. Pat. No. 3,357,011 (Diaz) discloses a system in which the call-in time is controlled by a clock at the end device, the clock also being used to periodically trigger transfers of data to a local memory for later transmission to the central station upon command.

Other systems in which calls are made periodically or at preset times are disclosed in U.S. Pat. Nos. 3,046,339 (Breen); U.S. Pat. No. 3,294,910 (Jackson); U.S. Pat. No. 3,510,591 (Klein); U.S. Pat. No. 4,056,684 (Lindstrom); U.S. Pat. No. 4,086,434 (Bocchi); and U.S. Pat. No. 4,104,486 (Martin et al.). In the Klein system, a schedule of times to call in is sent to an end device to be stored in memory and to be compared with clock signals to make a call-back at a desired time. U.S. Pat. No. 4,020,628 (Vittoz) and U.S. Pat. No. 4,125,993 (Emile, Jr.) illustrate systems in which signals may be transmitted through a telephone line to regulate the frequency or set the time at a remote clock.

Much of the effort thus far has been directed at the residential AMR market, which is far larger than the industrial/commercial users targeted by aggregators, but of little interest to them. Consequently, the sharing of a telephone line is not an issue; most large users have in-house PBX systems and local area networks, offering very low incremental cost for a connection. Similarly, aggregators have little interest in the small initial savings per end device that many of these specialized circuits yield. They can well afford to invest in the next higher level of integration, the computer-on-a-board, because the increase in functions (via software) yields substantial reductions in operating costs. Conventional AMRs were designed specifically to perform a chore that the utility companies were required to do.

Computer and microprocessor technology has developed very rapidly. Since the mid 1970's, microprocessors have been commercially available at relatively low cost to perform many complex functions. In addition, restrictions on the connection of equipment to telephone lines were removed during the period 1970–1975. Currently (the mid 1990's), similar deregulation is occurring in the telephone and the electric power industries, while commercial restrictions on the use of the global computer information network have been abandoned.

What is needed to enable real-time continuous trading of utility commodities is an AMR system that sends hourly (or more often) readings from geographically dispersed end devices at a very low cost per reading. Ideally, costs should be minimized by connecting each end device to the most economical network available at a customer's facility: local telephone calls to an e-mail network, in-house network messages leading to e-mail via the global computer information network, or long distance calls of very short duration to the central station.

SUMMARY OF THE INVENTION

The invention broadly comprises a method and apparatus for measuring use of a commodity and for transmitting the measurement over a global computer information network to a remote location. The apparatus of the invention comprises a data acquisition and reporting device; and, an automatic meter reading device operatively arranged to measure use of a commodity and transmit the measurement over a global computer information network to the data acquisition and reporting device.

DETAILED DESCRIPTION OF THE PREFERRED EMBODIMENT

The invention broadly comprises a method and apparatus for measuring the use of a commodity and transmitting that measurement over a global computer information network to a remote location. It should be understood that one such global computer information network is the "Internet", and the preferred embodiment described herein uses the Internet. The global computer information network may be public or non-public. The word "global" is not intended to be interpreted in its strict literal sense. For example, the network may be distributed over any geographic area (e.g., continent [or multiple-continents], country, state, county, city, metropolitan area, etc.). Intranets are also intended to be within the scope of the appended claims. The invention will operate with any similar computer information network, and the appended claims are not intended to be limited to the Internet or any particular Intranet.

Figure 1:
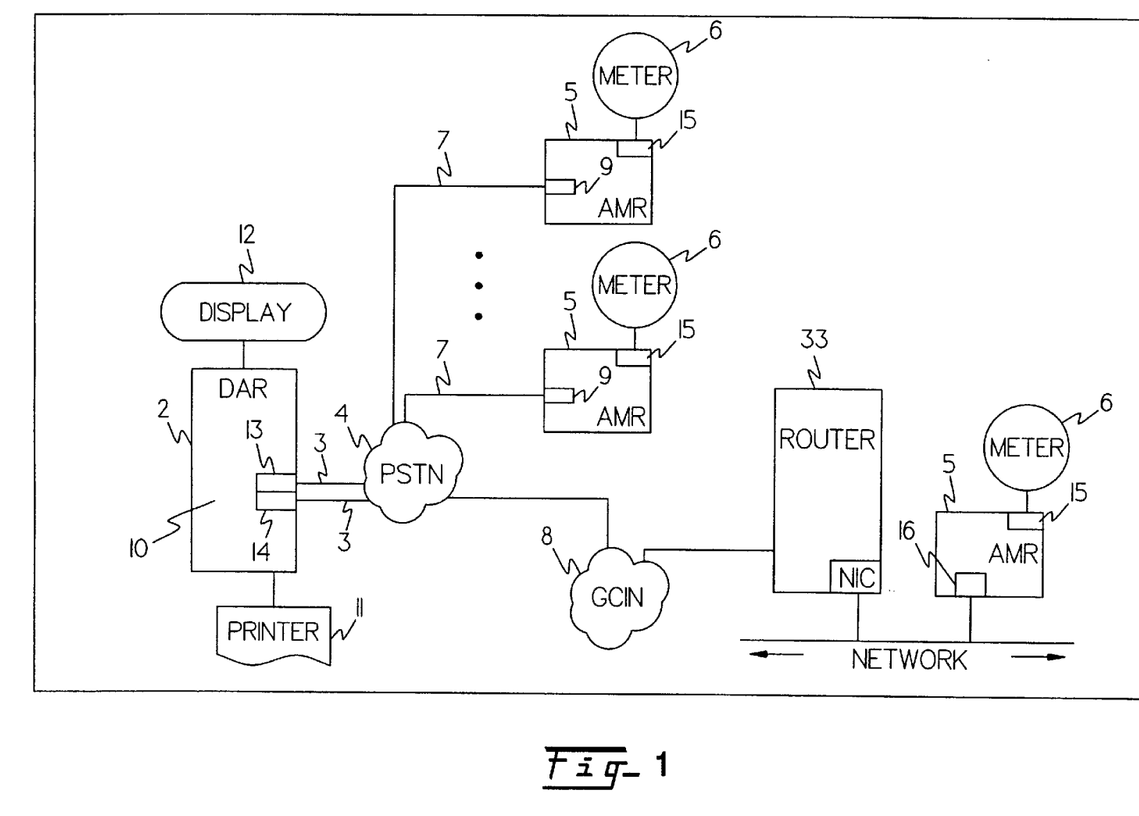
FIG. 1 is a block diagram overview of an Automatic Meter Reader and Central Station system.

Reference numeral 1 generally designates a Central Station and Automatic Meter Reading system constructed in accordance with the principles of the invention. System 1 comprises a Central Station, or Data Acquisition and Reporting (DAR) personal computer (PC) 2 (shown here with two internal modems 13 and 14), hereinafter referred to as the "DAR". The DAR is connected through one or more telephone lines 3 to exchange equipment of the Public Switched Telephone Network (PSTN) 4, two lines being shown. System 1 further includes a plurality of automatic meter reader (AMR) units 5 connected to meters 6, which may be water, gas or electric meters at the sites of customers (e.g., commercial and industrial customers). Each unit 5 is referred to herein as an "AMR" and in the preferred embodiment (shown diagrammatically in FIG. 2), is connected to the PSTN through telephone line 7 to its own modem 9. Telephone line 7 must be a line dedicated to the AMR device, i.e., with no other customer telephone connected thereto. However, the line may connect to the customer's Private Branch Exchange (PBX). The operation of the preferred embodiment is described in detail hereinafter, as is the structure and operation of an alternative embodiment (shown diagrammatically in FIG. 3).

System 1 is very efficient at receiving raw meter data in the form of electrical contact closures in proportion to the commodity consumed, developed at meter 6, and in the processing of such data, to develop highly useful output data for use by a corporation, utility or municipality, with provisions for storing data indefinitely. The AMR output data may include, for example, meter readings obtained at predetermined times, time-of-day accumulation (TOD) data, peak rate (PR) data, tamper and outage indications. The mode of the AMR operation is readily changeable or reprogrammable at its installation site, but preferably from the DAR or any other PC that can be connected to the PSTN, and that has the software available as designed to perform this function. The system is designed to facilitate the initial installation of AMR units, and thereafter the tracking of the operational status of all units, the making of analyses of operations, and the rendering of reports which may be printed or transmitted. The DAR PC includes one or more modems, a computer keyboard, a printer and display, and its operation is described in detail hereinafter.

Figure 2:
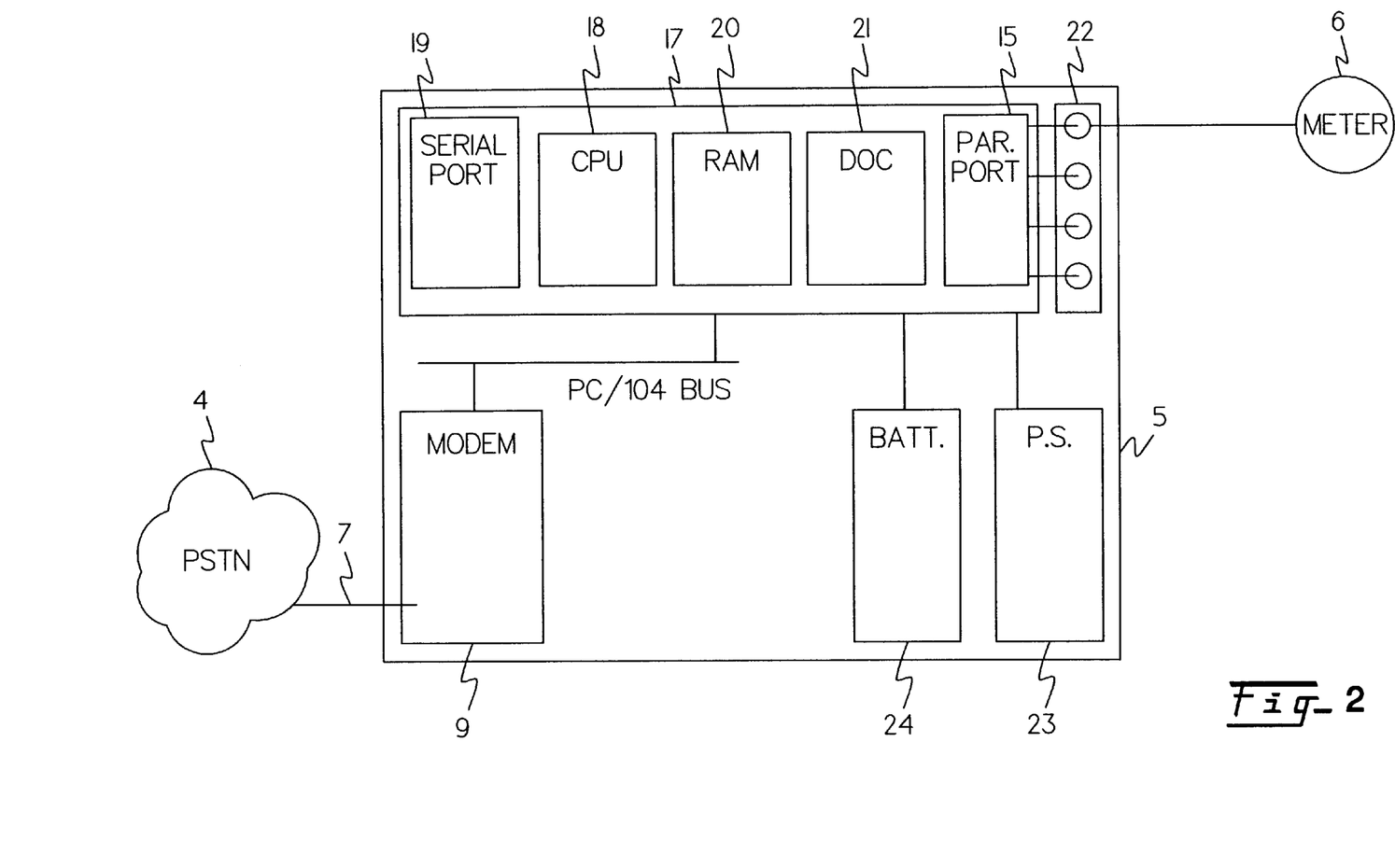
FIG. 2 is a block diagram of the preferred embodiment of an Automatic Meter Reader (AMR) system constructed in accordance with the principles of this invention.

In operation of the illustrated system, each AMR receives and processes raw meter data in the form of pulses, continually developing and updating TOD and PR data as well as accumulated readings. The Schlumberger Model S12(d)S, Form 12S, if equipped with a pulse initiator, is an example of such a meter. In a preferred embodiment, the AMR, at an assigned time, through its integral modem 9, proceeds to dial a telephone number corresponding to a line which is connected to an e-mail provider which is a member of a global computer information network 8. It then sends (uploads) an electronic mail (e-mail) message to an address corresponding to the global computer information network account of the DAR. In another embodiment, the DAR uses the global computer information network's File Transfer Protocol (FTP) to retrieve a file through a pre-existing Router (owned by the customer) from a global computer information network FTP server, which is in fact the AMR. In either case, the AMR transmits its information in a predefined format, and the e-mail message or file contains the processed meter data to be retrieved by the DAR.

At assigned times of its own, the DAR, through one of its available internal modems, proceeds to dial a telephone number corresponding to a line which is connected to the global computer information network (e.g., via a global computer information network service provider). In one mode of operation, the DAR reads (downloads) the e-mail messages that were sent to the address corresponding to its global computer information network account by the plurality of AMRs. In another, it uses the global computer information network standard File Transfer Protocol (FTP) to retrieve the aforementioned AMR files from a designated FTP server, which is, again, a PC that is a host on the global computer information network. This FTP server is the AMR itself, and the file already resides on the logical hard disk of the PC. In any case, the DAR retrieves the formatted information, where each message and/or file constitutes the processed meter data that has been transmitted by the plurality of AMRs.

One of the most important features of the invention relates to the use of the global computer information network data transmission capabilities. Every unit in this system should be able to transmit or receive its data via a "local phone call", thus enabling a global distribution of AMR units, with no significant increase from the cost to operate a regionalized system (for example, one that is restricted to a specific municipality). Also, there is no time at which any device must necessarily be in a condition to respond to a demand for attention from any other device within this system. That is, within the reliability limitations of the PSTN and the global computer information network, each AMR can always transmit its data at its assigned time(s) which, could be exactly the same local time for all of the plurality of AMRs distributed across a region (for example, at 12:05 a.m. local time). Similarly, the DAR can collect all of its data at any time of the day or night with one phone call, doing the equivalent of "polling the AMRs through the global computer information network" for any new data. This activity can be performed many times per day, with potentially very short time intervals between calls, enabling an extremely fast rate of data collection. Since all phone calls within the system are "local" to the unit making the call, it is not necessary to compensate for long distance calls by calling during lower rate night-time hours.

As described in detail hereinafter, the DAR stores both informational and control data which may include the telephone numbers for each AMR, and data applicable to specific AMR units, including serial number, location, owner, and any informational data as to the time periods at which it is to report. Such control data can be altered from the DAR. However, at the time of call from any DAR to an AMR, any control data in the AMR must be altered manually by an operator at the DAR operator's console.

As described in detail hereinafter, the AMR stores only control data specific to itself, which control data is required for its independent action. These data may include the telephone number for its local global computer information network e-mail provider, and data applicable to specific AMR units, including serial number and any informational data as to the time periods in which it is to report, and configuration data pertaining to the specific meter(s) to which it is connected. These are examples of the types of control data that can be initialized or changed remotely from the DAR.

Although the DAR is equipped to simultaneously transmit and process calls on a plurality of telephone lines, the illustrated DAR is shown as being connected to only two lines, because in normal operation only one phone call is required to collect all of the data from the plurality of AMR units. The second phone line allows, for example, a DAR operator to call to a specific AMR and initialize or alter its configuration parameters, according to the principles described above.

These and other features of the AMR, as well as associated features of the DAR and the interaction of the DAR with the plurality of AMR units, are described in detail hereinafter.

Data Acquisition and Reporting (DAR) 2

DAR 2 is shown diagrammatically in FIG. 1, and it includes PC 10 with a hard disk drive, a diskette drive and an optional tape drive for performing backups of its software and stored AMR data. In the preferred embodiment, the PC is an IBM-compatible computer. The PC is connected to display 12 which may be a super-VGA (SVGA) display. PC 10 is also connected to printer 11, and it is powered through a surge suppressor from an uninterruptible power supply (UPS) (not shown).

Also shown diagrammatically in FIG. 1, the PC interface to the PSTN comprises two internal modems 13 and 14, connected to the PC motherboard. The Central Processing Unit (CPU) may be an Intel® Pentium® processor, and it and the Random Access Memory (RAM) are all on a typical PC motherboard. The RAM should have a minimum sixteen megabyte capacity. Each of the modem units 13 and 14 in the illustrated embodiment, is a model "DeskPorte 28.8" (or equivalent) and is manufactured by Microcom of Norwood, Mass. Any compatible modem with speed above 2400 bits/second (bps) would suffice.

Each modem has a standard RJ-11 telephone connector, for connection to a telephone line, two of which are shown. Control and dialing means are provided for seizing a telephone line and making an outgoing call, as required to collect the AMR data, or to alter the configuration of an AMR. A 28,800 bps rate is used in communications between the DAR and the global computer information network, for those data transmission activities.

With a DAR as shown and with programming as hereinafter described, a very large number of AMRs can be accommodated for efficient, accurate and reliable receipt of meter data, and for compilation, printing, storage and transmission of such data to facilitate record-keeping and analyses of operations.

Automatic Meter Reading (AMR) Units 5

FIG. 2 is a block diagram of an AMR. Each AMR unit includes either one network interface or one telephone system interface, one PC battery and a power supply. The AMR's computer comprises one CoreModule/PC 17 (or equivalent) (available from Ampro Computers Inc., of Sunnyvale, Calif.), manufactured in the single-board IEEE Standard 996.1 (called the PC/104) form factor. This unit has one Intel® 8088 Central Processing Unit (CPU) 18 running at 10 MHz, with one Parallel Port 15 and one Serial Port 19. This CPU can be upgraded to PC/104 units with much higher speed and capacity. Each AMR has a minimum of 256 KBytes of Main Memory (RAM) 20 for storage. This provides approximately 192 KBytes for storage of programs and meter count data.

One serial port is available for direct (on-site) serial asynchronous data communications to the AMR, and for the preferred embodiment one Aprotek MiniModem Model 8100, an internal 2400 bps modem 9 (available from Aprotek, Rogue River, Oreg.), is used for remote serial asynchronous data communications, that is, typically between the AMR and the global computer information network. Al on-site operator interaction with the AMR is via a directly wired serial communication cable through the serial port, from a user-supplied console, for example a portable PC. Remote access to the AMR is provided via the AMR modem 9 interface through the PSTN. Therefore, data communications can take place via two channels: a serial port 19 addressed as COM1:, and the Aprotek MiniModem 9. This modem 9 is a PC/104 version of a "Hayes Smartmodem", capable of understanding all of the Hayes "AT" commands, receiving and sending data at 2,400 bps.

One 28-pin DiskOnChip 21 (available from M-Systems Inc., Santa Clara, Calif.) is installed in the 32-pin Socket of the Ampro CoreModule/PC, to provide 720 KBytes of secondary storage as a logical "Drive C:".

The Ampro CPU's parallel port 15 is configured for "extended mode" operation to enable four digital input signals. This port is used to track the contact closures of the meter pulses. In the preferred embodiment, meter output rates can be as high as 20 pulses per second (i.e., a 50 mSec period), but each pulse must be at least 15 mSec in duration. Other embodiments are envisioned having other sampling rates and different pulse counts and pulse durations.

All components are mounted within one NEMA-1 steel enclosure with a rear-mounted panel. This level of protection is suitable for use only within commercial or industrial buildings. Outdoor installations will require hardier enclosures and additional components.

Additional wiring to a terminal strip 22 provides four terminations that can be used to detect up to four sets of meter pulses, where a pulse is generated by the meter sensor unit as a dry contact closure. The PC/104 boards (CoreModule/PC and modem 9) of the AMR are energized at all times through a power supply 23, connected to a standard 120 Volt AC, 60 Hz power source, such as that typically provided by the local electric company. A 3.6 Volt lithium battery 24 is also provided, to maintain the AMR PC's date-time settings and other configuration values during outages of the site's AC power.

Operation of Data Acquisition and Reporting—DAR

Figure 4:
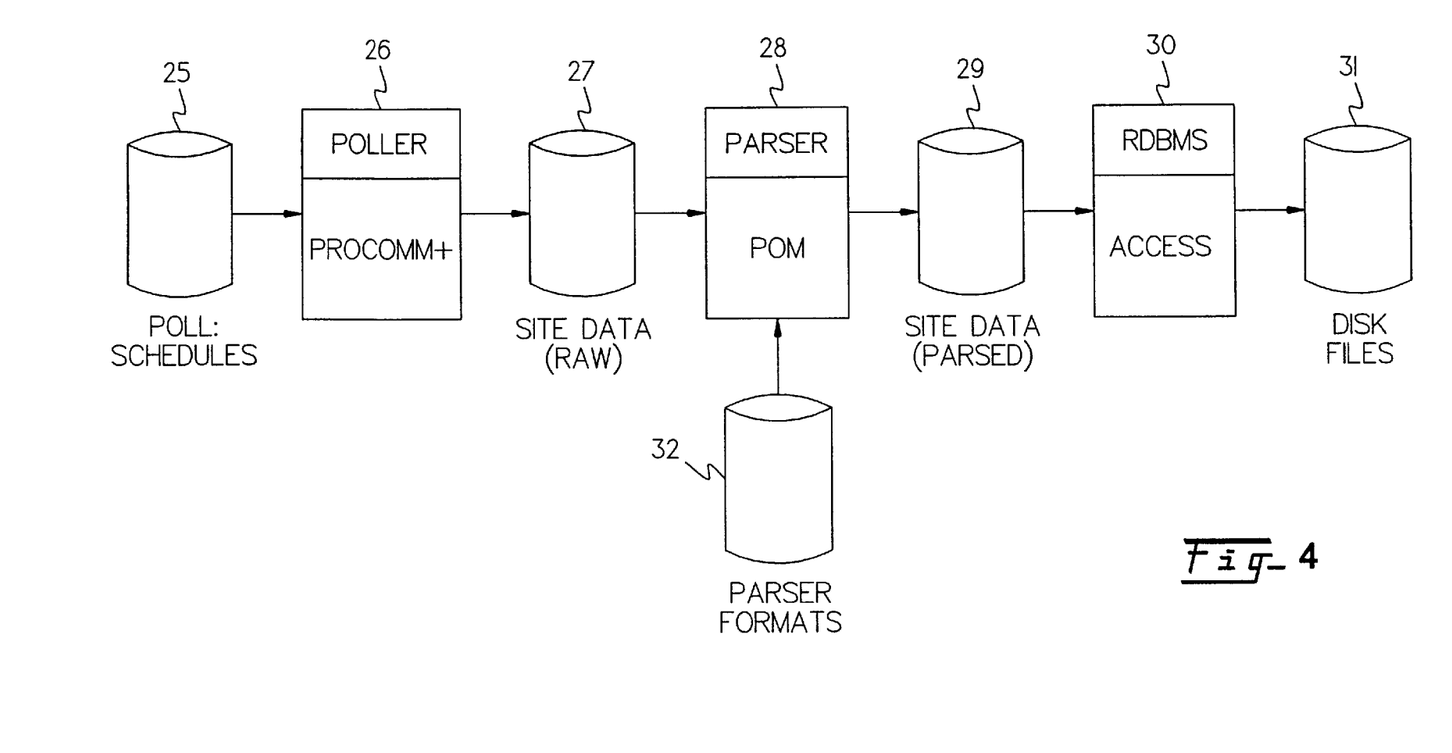
FIG. 4 is a data flow chart for the actions and processing performed by the Data Acquisition and Reporting (DAR) computer in relation to the preferred embodiment.
Figure 5:
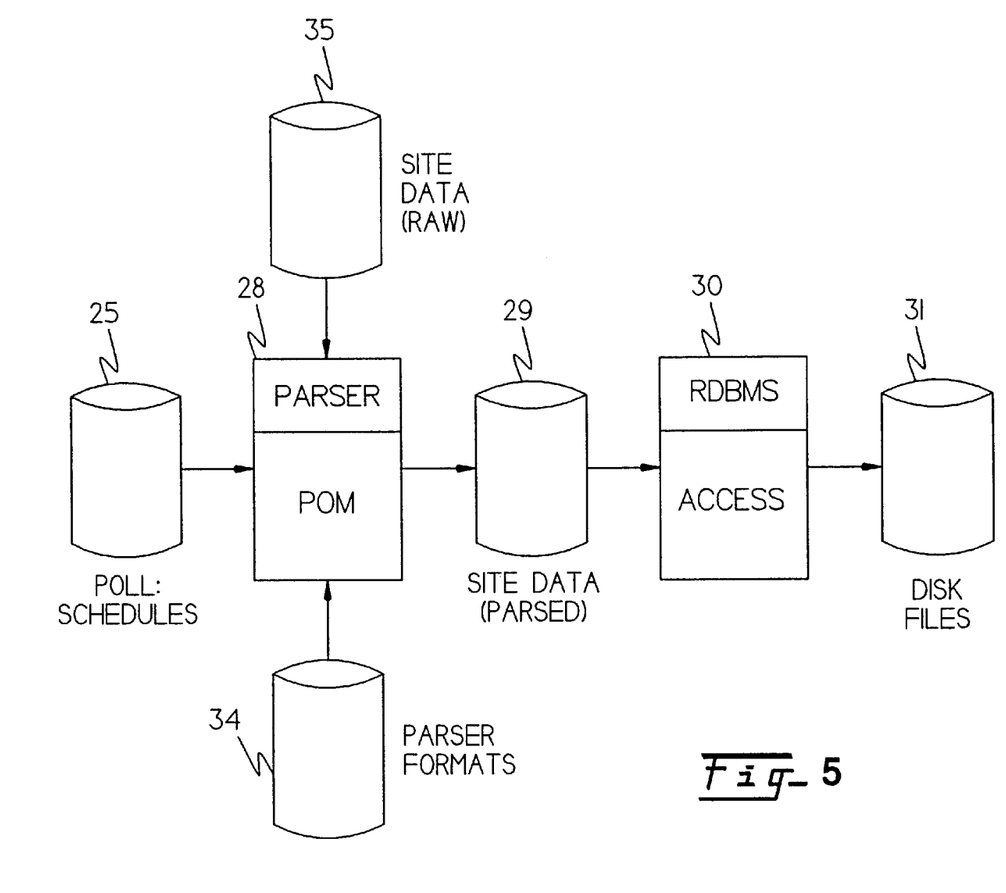
FIG. 5 is a data flow chart for the actions and processing performed by the Data Acquisition and Reporting (DAR) computer in relation to an alternate embodiment.

The mode of operation of the DAR is illustrated in the data flow chart of FIG. 4, in which the names of the commercial software programs are set forth for reference. Note that for clarity, commercial software is shown in rectangular boxes while disk files are shown as cylindrical shapes. FIG. 5 illustrates the flow chart of the data for an alternate embodiment, and uses the same shape designators as used in FIG. 4.

The commercial software packages used in the exemplary DAR are: Procomm for Windows 26 from Datastorm Technologies Inc., Columbia, Mo., used for the modem communication functions; Parse-O-Matic (POM) 28 from Pinnacle Software, Montreal, PQ, Canada, used to parse the data messages and files to produce new files that are suitable for import into the database; and Microsoft Access 30, from Microsoft Corp., Redmond, Wash., which is the database that contains all of the meter data from the plurality of AMRs, and additionally the reports, forms, queries, etc., that are used to display the data in report and graph formats for customer evaluation.

In the preferred embodiment, a CompuServe® account was used by the DAR to retrieve the AMR files that were posted on CompuServe®.

Exemplary files, which include the parsing file Cis-mail.Pom and script Cis-mail.Was, are included in the microfiche appendix to this specification. One or more files are required for each commercial software component used for the DAR. The schedule, scripts and dialing directory are for Procomm, the parsing files are for POM, and the macros, reports, forms, etc. are all integrated within a single Access database (MDB) file.

At start-up, the Windows NT Server operating system is loaded from the hard disk into the DAR, and then the Procomm Plus for Windows 26 scheduling application is loaded. Excepting operator initiated calls directly to an AMR to manually modify configuration parameters, the Procomm Scheduler application controls the execution of all of the DAR data acquisition and storage applications through its time-of-day oriented Schedule 25. Any viewing and printing of graphs and reports of the previously collected AMR data is done independently, at the discretion of the system users.

The Schedule 25 (Pwsched.Dat) consists of a command that causes Procomm to load and then execute the script Cis-mail.Wax which performs the following: creates an error log Cedarerr.Log for this session; and performs the actual telephone dialing and data collection. The script performs additional functions, as described below. The other entry in the Schedule causes Microsoft Access 30 to load and execute a macro that imports the newly acquired and processed data, after all other sequences have been completed.

The first scheduled event causes Procomm 26 to load and then execute Cis-mail.Wax, the data collection script. The data are acquired as mail messages received via the Internet, and are stored as raw Message Site Data 27 on the DAR's hard disk. The included Procomm dialing directory and this script will call CompuServe® in this embodiment, CompuServe® is used as the Internet service provider (ISP) using a local phone number and a CompuServe® account that is dedicated to the DAR, and will use CompuServe®'s Mail function to retrieve the AMR messages posted through the global computer information network. The same script next starts an MS-DOS session, which loads POM 28, the data parser. POM 28 processes the Message Raw Data according to the instructions in the Parsing 32 disk file associated with this sequence. The result is comma-delimited Site Data 29, which is then easily imported into Access 30 by the Access macro that was mentioned above. When Access is closed, the Access Database is saved to the hard disk 31, thus also saving all data, including the newly acquired data, for later examination by the DAR users.

In the alternate embodiment illustrated in FIG. 5, the system uses the customer's existing network and Internet connection, and the DAR employs the TCP/IP and FTP capabilities that are included with the Microsoft Windows NT operating system, upon which the DAR software executes. Specifically, it uses the Microsoft Internet Information Server version 2.0, included with Windows NT Server v4.0, to temporarily become a "host" node on the global computer information network with FTP client capabilities. The DAR then retrieves the files directly from the plurality of AMRs as direct file transmissions using the File Transfer Protocol.

At this point in the sequence, the raw File Site Data 35 is in approximately the same state as the raw Message Site Data 27 (FIG. 4) that was retrieved from the Internet in the preferred embodiment; both are stored as disk files on the DAR. Thereafter, the Procomm Scheduler 25 regularly processes these data according to a timed schedule, using POM 28 and its Parser disk file instructions 34 to generate comma-delimited Site Data 29, which is imported into the Access database 30 and stored as a DAR disk file 31. As just indicated, once the Site Data files 35 are retrieved, this processing is very similar to that performed by the preferred embodiment.

An important function of the DAR is to facilitate entry of identification AMR data, which can later be edited as required. Under manual control by a DAR operator, control data can be transmitted to the AMRs as an initial installation transaction, and also in subsequent alterations of the AMR configuration. The DAR is also operative to automatically retrieve and store data from a plurality of AMR units through the global computer information network, being also operative to parse these data messages and/or data files, and to place the results into the proper database fields. It is also usable to print data in the form of various reports and graphs employing a printer, or to display these data on a SVGA monitor.

The DAR uses high speed processing circuitry and is very fast and efficient in handling these functions. Its cost is, of course, very much greater than that of an AMR. However, since its cost is, in effect, shared by all of the AMRs (which may run into the thousands), and since the communications costs of each AMR are reduced, there is a very substantial overall reduction in the operating costs to the purchaser of such a system.

A further advantage of the arrangement using the DAR such as disclosed, is that it provides a great deal of flexibility with respect to changing modes of operation if required. The software for the DAR is loaded from the hard disk, and with a surge suppressor and a UPS, a high degree of system reliability is obtained, with assurance against loss of meter data. It should also be noted that in normal operations, the meter data is only briefly stored in the main memory (RAM) of the DAR, with frequent transfers to both the hard disk and the Access database, so the meter data is thus safely stored, with floppy disk or tape back-ups being regularly made, if desired.

Operation of Automatic Meter Reader—AMR

Figure 3:
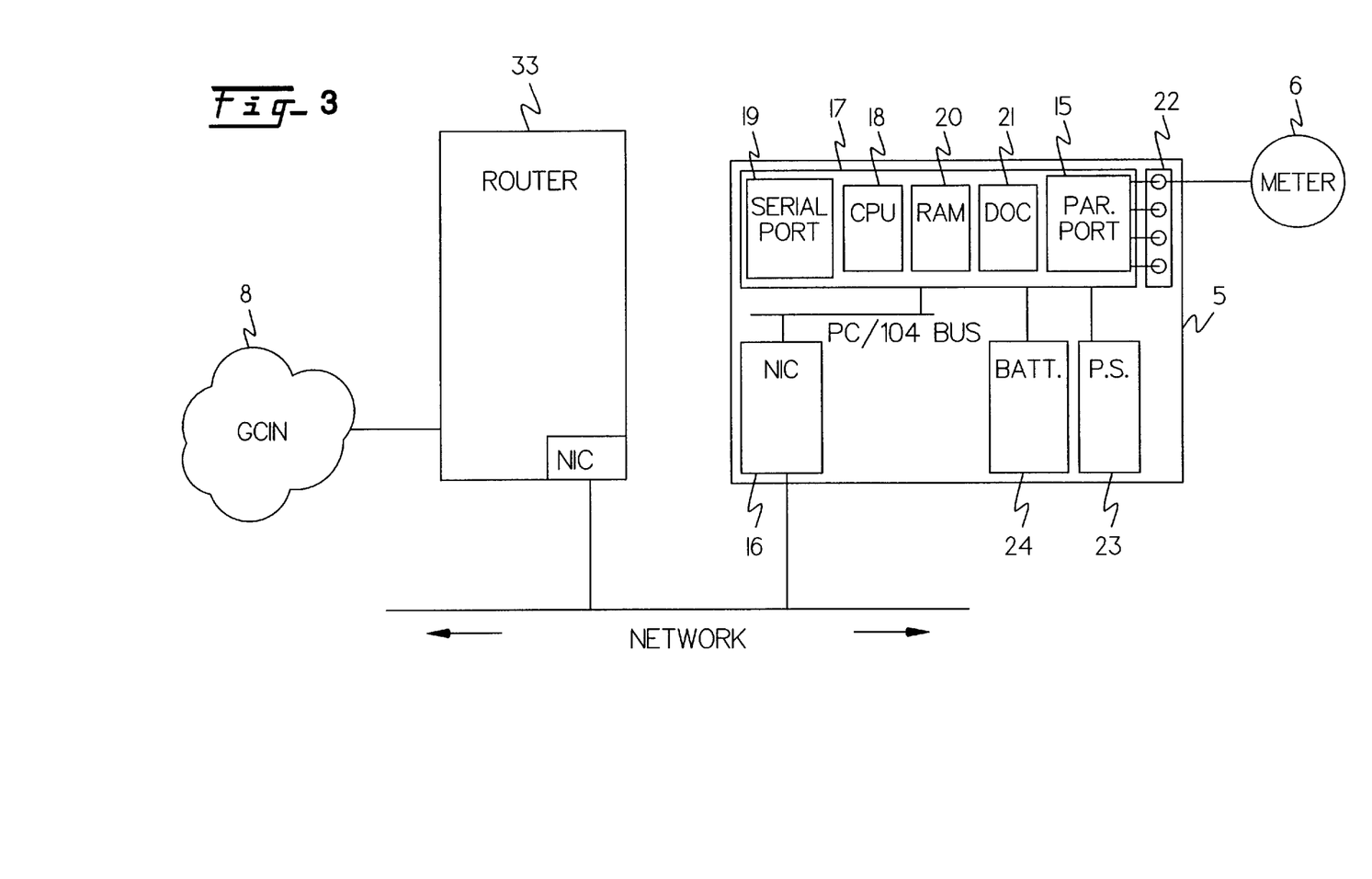
FIG. 3 is a block diagram of an alternate embodiment of an Automatic Meter Reader (AMR) system constructed in accordance with the principles of this invention.

Referring to FIGS. 2 and 3, upon power-up, the DR-DOS operating system is loaded from the DiskOnChip 21 into the AMR's RAM 20, and then the meter reading software is loaded. An example program Mtrrdr.C is contained in the microfiche appendix to this specification, which also includes the makefile Makefile.Mak and the additional required files Report.C and Mtrrdr.H. Each program is formulated for an Intel-type CPU and compiled for the AMR's operating system. This program is composed of functions, with a naming convention that is oriented towards describing the purpose of the function, as indicated therein by program comments.

The commercial software packages used in the exemplary AMR are: DR-DOS v5.0 from Digital Research Inc., Monterey, Calif. used as the AMR operating system; Greenleaf CommLib from Greenleaf Software Inc., Dallas Tex., a "C" library used for the modem communication functions in the preferred embodiment; and Microsoft's "C" Compiler for DOS, from Microsoft Corp., Redmond, Wash., which is the compiler that is used to create the executable programs that comprises the AMR software.

Figure 6:
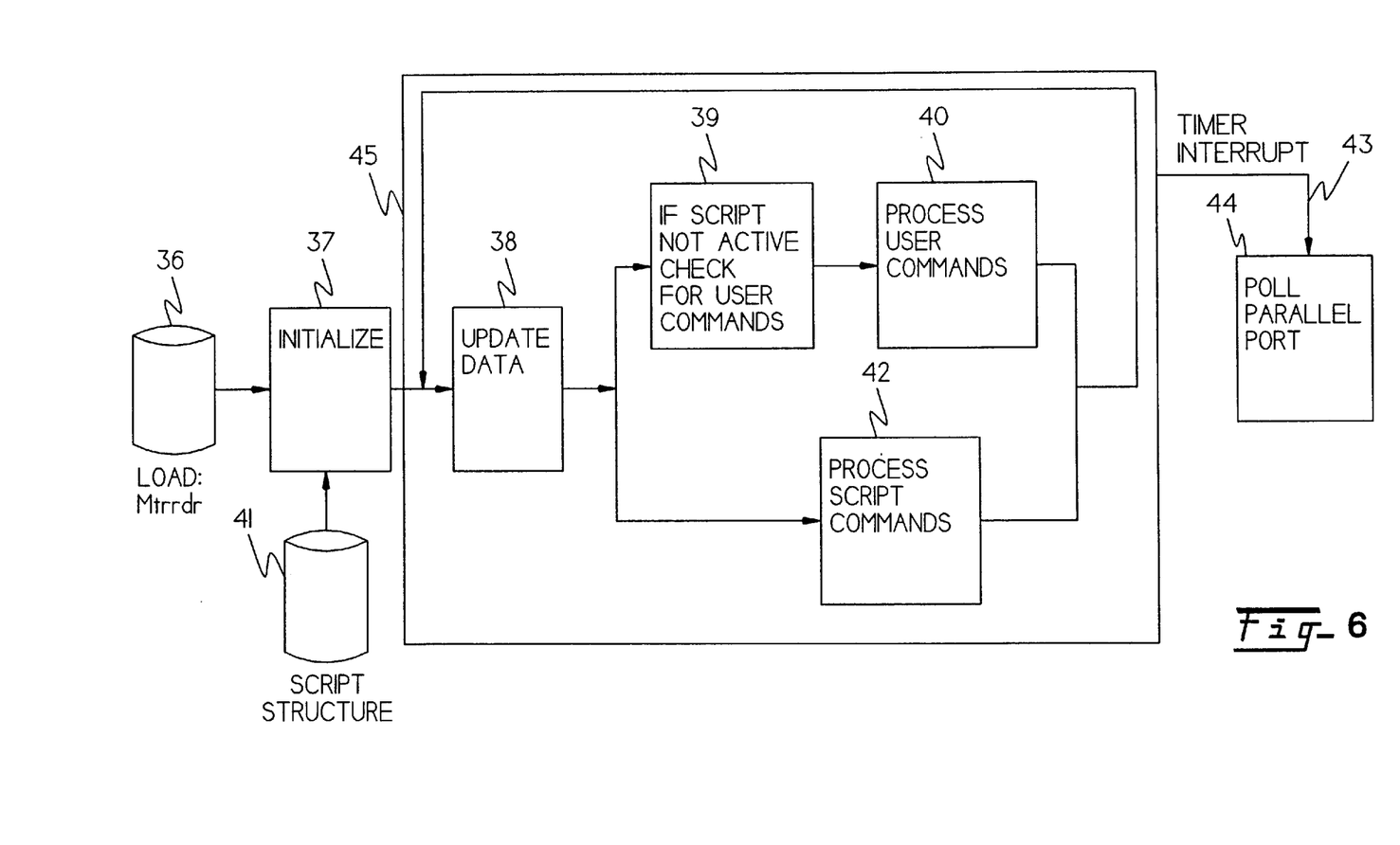
FIG. 6 is a flow chart which illustrates the sequential processing of software in the AMR.

The mode of operation of the AMR is illustrated in the processing flow chart in FIG. 6, which depicts the sequential processing of the software. After power is applied to the AMR, the AMR software 36 (i.e. the program Mtrrdr.Exe) is loaded by the operating system, through a standard DOS Autoexec.Bat file. The AMR program consists of a number of functions; the function named "main" controls all processing sequences performed by the AMR. The "main" function first performs a number of steps that Initialize 37 various values to their initial conditions. These actions include using function "get_conf" to read the AMR's Configuration EEPROM, and retrieve some of the initialization parameters that are stored there in non-volatile memory. The communications port is initialized by function "init_port" and its buffers are cleared. The function "get_port" initializes the parallel port for data collection. The "main" function zeroes out the history data buffer, and its data indexes are set to initial values. The "main" function also gets the vector to the existing DR-DOS timer interrupt service routine and then chains to it after it finishes processing the Initialization 37 steps, substituting the address of its reader routine into the vector table. This enables the function "read_inputs" to poll the parallel port to determine if any meter pulses have been generated. The polling is thus synchronized to the AMR's timer pulse, at a standard PC polling rate of 18.2 times per second. The Script File 41 is read from the logical hard disk (the DiskOnChip) into a program structure named "script_table", so that all site-specific data and processing instructions are incorporated into this instance of the program. The structure "script_table" is defined in the file Scripts.H, which is included in the microfiche appendix to this specification. The script file is generated by an off-line program, as described below, and then is copied onto the AMR's DiskOnChip, either when the AMR unit is assembled, or through a transmission from a remote PC, for use at the meter site.

After the above startup sequence has run to completion, the "main" function starts the primary processing loop, which can be exited only by the removal of power to the unit, or by the receipt of an abort command through the user interface. The support for Receipt of User Commands 39 and the Processing of User Commands 40 is built into the program to support the DAR's capability for on-demand transmission of commands and retrieval of the data values in the AMR. Processing of these commands is performed by the function "cmd_parser", and the documentation for the protocol of the User Commands is available from Jenney Systems Assoc., Ltd.

While in the primary processing loop, other functions are called by the "main" function as required, causing them to execute, but always returning control of software processing to the "main" function. Note that it is a principle of the "C" programming language that while it is executing, any function can itself cause additional functions to execute.

In normal operation the first step in the primary processing loop is to Update Data 38 by calling the function "update_indexes", which updates the pointers and the data in the history buffer. Next, if there is no script that is active during this processing loop, the Check for User Commands 39 is performed. The command buffer is checked for any contents by the function "poll_command", and any commands are processed and then the command buffer is cleared. However, in normal operation, the next step will be to check the Script Schedule to determine whether to Process Script Commands 42, performing the actions that are specified in the Script File 41. The contents of the Script File 41 will generate a schedule, that is developed when the script is read in during the Initialize 37 phase. The timed processing of this schedule is set by the script parameters Period, Hours and Minute. The Period determines how often the script is to be executed, e.g., if Period equals 24, then it will run once every 24 hours. The Hours and Minutes taken together specify the start time for script execution.

The script itself determines the actions to take when the Script Schedule indicates that it is time to Process Script Commands 42.

Examples of scripted actions include SEND, which transmits a string to the AMR's modem, for example to dial a specific phone number. The REPORT action generates and then transmits (through the AMR modem) one of the AMR's reports. The RESPONSE action pauses the script processing until a particular string is received by the modem (e.g. "OK"). The optional TIMEOUT action sets a timeout, most often for the Response action, to prevent the script processing from waiting forever for a response to be received when transmission error conditions have developed. As is evident from the above, site-specific scripts can easily be developed to transmit reports to the DAR, in the form of e-mail messages, at any of a wide variety of intervals. The source code for the script processor, which converts the text file of script commands into the file that is the structure imported into the AMR software, is included in the microfiche Appendix to this specification, as Scripts.C. An example source script is included in the microfiche appendix to this specification as Scripts.Scr.

For direct communication between the AMR and an e-mail service connected to the global computer information network through the AMR's modem, the communications system operates at 2400 bps, with 7 Data bits, even Parity, and one Stop bit, to match those of the e-mail service provider used in the exemplary software.

The AMR software also performs data processing operations on its raw (meter pulse count) data to generate reports, through the function "prep_report". These reports become the responses to some of the user requests in the Process User Commands 40 step. Some of the reports also become the contents of the e-mail messages and files that are transmitted across the global computer information network to the DAR. These e-mail messages are developed by functions such as "summary_report" and "detail_report", which format the data from the history buffer in a relatively comprehensible and compressed format, thus additionally minimizing the duration of transmissions to the DAR. Reports can be generated for any of the maximum of four meters, or for a summation of all of the meters that are being polled by this AMR.

As described earlier, FIG. 3 generally designates an alternate embodiment of an automatic meter reader or "AMR" constructed in accordance with the principles of the invention. The hardware for all components of the system is identical, excepting that the system must have a larger quantity of installed RAM 20 to support the use of the FTP functions, and a Network Interface Card 16 replaces the AMR's Modem 9. This configuration also presumes the presence of a customer-owned LAN with a Router attached continuously to the global computer information network, allowing a permanent global computer information network connection for any PC on the LAN. The software components for the AMR's initialization, pulse counting and the formatting of data for transmission are identical to the preferred embodiment. This embodiment only differs in that the software logs the data to the logical disk (the DiskOn-Chip 21) as a disk file, and the global computer information network's FTP support is added to the AMR software, to enable this file to be transmitted through the global computer information network. That is, instead of using the e-mail messaging technique, data files are retrieved by the DAR from the AMR, which is acting as an FTP Server, the AMR being a permanent node on the global computer information network itself. The advantages of using the FTP approach include the fact that one distinct connection is established between the two communicating computers, which lasts only for the duration of the data transfer (nominally a few seconds); also, individual connections are logged to disk for subsequent diagnosis if needed, unlike e-mail, where no such diagnostic data is available for the cases in which a message might be lost in transmission.

For the alternate embodiment that uses the FTP file transfer protocol, the AMR uses the TCP/IP and FTP capabilities that are included in the package freely available from the National Center for Supercomputer Applications (NCSA). It is generically referred to as NCSA Telnet, and version 2.3.03 was used to develop this embodiment. NCSA Telnet includes FTP access from an IBM-compatible PC to Telnet hosts on TCP/IP networks. This software was available from the Internet site ncsa.uiuc.edu at the time that this version was assembled and provided to the public by NCSA. To support the TCP/IP communications protocol that is required for global computer information network FTP activities, a Network Interface Card 16 (NIC) is required to be mounted in the AMR, with a network connection to the customer's existing global computer information network Gateway or Router. For this embodiment, the NIC is an 8-bit version of a MiniModule/ETH-II from Ampro Computers Inc., of Sunnyvale, Calif.

The NCSA source code has been modified to incorporate its capabilities into the software that exists for the preferred embodiment. As requested by NCSA, the expression "Portions developed at the National Center for Supercomputing Applications at the University of Illinois at Urbana-Champaign" is included in each code module that was used for AMR development. This modified source code is available from Jenney Systems Associates, Limited.

Specifications of the Automatic Meter Reader (AMR)

The exemplary AMR units contain custom software that performs the following functions (refer to FIGS. 1, 2 and 3):

Polling: up to four digital input signals, in the form of dry contact closures at Terminal Strip 22, from up to four Meters 6, are polled to collect counts. Each input is filtered, i.e. subsequent pulses are gated off for 40 mSecs, to eliminate contact bounce. Counts are placed into program variables in the RAM of the AMR; peak power and its time are similarly saved in variables, as defined by the Demand Interval, nominally 15 minutes.

Reporting: a communications protocol is applied to format the data, allowing a minimized transfer time for these data, whether it is in the form of e-mail messages through global computer information network or files transferred through FTP. Additional features of this system include remote modification capability for most operating parameters.

For each Demand Interval, the following are stored: DATE: 4 Bytes; TIME (as Minutes-after-Midnight): a 16-bit Integer; and ENERGY: a 16-bit integer count of Consumption pulses. This makes a total of 8 Bytes per Demand Interval per meter.

Each day, a Summary is also calculated and stored: DATE: 4 Bytes, DD,MM,YYYY in Binary Coded Decimal (BCD); ENERGY: 4 Bytes; PEAK_POWER: 2 Bytes; TIME_OF_PEAK: 2 Bytes; for a total of 12 Bytes per day per meter.

Directions for Components of the System The following sections provide instructions for installing a working DAR (Data Acquisition and Reporting system) as described as the preferred embodiment in the patent specification. Besides the commercial software described in the specification and referenced below, at least one CompuServe® e-mail account must be acquired and used for this embodiment. For demonstration purposes, this account could be used by both a single AMR and the DAR, to exchange meter data. For multiple AMRs, each should have either an "in-house" e-mail account or its own Compuserve e-mail account, and the DAR should have a dedicated account also.

Directions for Components of the Access Database

The Microsoft Access database installation package contains a number of database functions. Some of these, including Queries, Forms, Reports and Access Basic code modules, are used arbitrarily to implement a DAR according to the customer's needs for data display and reporting. This section describes the minimum necessary steps to prepare a database for DAR functions. All detailed instructions to perform these steps are included in the Microsoft Access manuals. The first step is to create an Access database, arbitrarily named Meterrdr. Then develop the contents as described below, again using arbitrary names for the Tables ("MeterData" and "Sites") and the Macro ("DAR"). See also "Directions for Components of Procomm for Windows" below.

Tables

Two Tables are needed to implement the DAR. One Table stores the site data, and the other holds the meter data as they are acquired.

The structure of MeterData Table is as follows:

| Identifier | Data Type |
| --- | --- |
| Site Code | Number - Integer |
| Collection Date | Date/Time |
| Data Date | Date/Time |
| Data Time | Date/Time |
| Meter Number/Name | Text - 8 characters |
| Demand | Number - Long Integer |
| Data Number | Counter - *Index* |

Note: this Table can initially be empty.

The structure of Sites Table is as follows:

| Identifier | Data Type |
| --- | --- |
| Site | Text - 20 characters |
| Site Code | Integer - *Index* |
| Owner | Text - 15 characters |
| Local Engineer | Text - 25 characters |
| Site Engineer | Text - 25 characters |
| Local Manager | Text - 25 characters |
| Configuration | Text - 1 character |
| Notes | Text - 50 characters |
| Address | Text - 30 characters |
| City | Text - 20 characters |
| State | Text - 2 characters |
| Zip Code | Text - 10 characters |
| Area Code | Text - 3 characters |
| Telephone (Voice) | Text - 8 characters |
| Telephone (Fax) | Text - 8 characters |
| Telephone (AMR) | Text - 8 characters |
| Meter Factor | Number - Single |
| Serial Number | Number - Long Integer |
| Spare Text | Text - 25 characters |
| Spare Number | Number - Long Integer |

Note: this Table must contain at least one entry in order for the Access Macro to execute without error. One dummy entry must be created, with a Site Code of 901. This Site Code is also used as the default in the POM script, which is included in the microfiche appendix to this specification (see also the next section, Directions for POM Processing).

Relationships

Using the Relationship function in Access, create the following Table Relationship: make a Join of Site Code in the MeterData Table, to Site Code in the Sites Table. The type of Join must "Include only rows where the joined Fields from both Tables are equal".

Macros

Using the Macro function in Access, create a macro named DAR to perform two processing steps. The first step imports the AMR data into the database. The Action uses the Access function "Transfer Text", and the Transfer Type is "Import Delimited". The table name must match the name for the meter data Table, i.e. MeterData. The file name must match the name of the output file from POM Processing, i.e. Cis-Mail.Txt (see later sections of this document). The specification name is blank, and the Has Field Names entry should be set to "No". The second step in the macro closes Access after the import of the newly acquired data. Set the Action to "Quit", and the Options to "Save All".

Directions for POM Processing

In the POM script Cis-Mail.Pom, which is included in the microfiche appendix to this specification, the following section must be modified to accommodate any arbitrarily chosen site names and codes:

```
;Determine SITE-ID; use the "From:" field in the capture file
SET FROM = $FLINE[1 5]
SET SENDER = $FLINE[8 13]
BEGIN FROM = "From:"
    SET SITE-ID = "901"
    IF SENDER = "Site1 " THEN SITE-ID = "1"
    IF SENDER = "Site2 " THEN SITE-ID = "2"
    ;et cetera
END
```

Duplicate any additional SENDER (Site) and SITE-ID (Site Code) entries within the BEGIN-END section, and insert the Site Names and Site Codes respectively into the quotes for each line. The Site Names for this script are actually (as a minimum) the first five letters of the user names for the Compuserve accounts being used for the system. Be sure to create a corresponding entry in the Site Table of the Access database (see Directions for Components of the Access Database, above), so that the SITE-ID matches the corresponding entry (Site Code).

Directions for Components of Procomm for Windows

The Procomm for Windows communications package contains a variety of functions, including for example support for faxing, and a wide variety of configuration tools used to optimize use of the package. For the DAR, the only relevant components are the Procomm Scheduler and Procomm Plus, which is used to perform the actual communications. All detailed instructions to configure both the Scheduler and Procomm Plus are included in the Procomm for Windows manuals.

Procomm Plus

At least one dialing directory must be created for DAR use. Any name can be chosen for it, but that name must be used in the command for the Procomm Scheduler (see below). Once a dialing directory has been created, at least one Data entry must be added, to define the phone number and password for the Compuserve account to be used by the DAR, and also to specify the script and capture file filenames used in DAR processing.

The following values for the DAR entry in the dialing directory are or can have arbitrary values: Entry Name, Port Settings, and most of the Basic Options. That is, many of these depend on the hardware platform being used for the DAR. For Entry Info, click on the Logon Info button, and then enter the Compuserve User ID and Password for the account that is to be used by the DAR. For Port Settings, configure for Compuserve by using Even Parity, 7 Data Bits and 1 Stop Bit. Under Basic Options: the script must be Cis-mail.Was, which is included in the microfiche appendix to the patent specification. Under Setup for the script, check that it will "Start script after connection is made". The capture file must be named Cis-Mm.Cap if the provided script is used, and under Setup it must be set to "Write text as it appears on the screen" and "Overwrite existing capture file".

Procomm Script

This script requires that Access be stored in the directory C:\ACCESS and that the POM files are stored in the directory C:\POM. The file Dummy.txt, referenced in the script, is a simple text file containing dummy entries for all values, with a Site Code of 901, structured as indicated in the script Cis-Mail.Pom. It should be copied into the Procomm directory after Procomm is installed. The only function of this dummy file is to allow unattended processing to continue if the software is unable to contact CompuServe®, or if there are no waiting messages from AMRs. That is, this dummy file is processed and imported when there are no new data available. All of the above names and directory locations can be changed to suit a particular installation, provided that the script is first edited to reflect these changes, and then recompiled.

Procomm Scheduler

Although the DAR can be run manually to acquire the AMR data, using similar methods to those described below, the Procomm Scheduler is normally employed to acquire the same data in an unattended fashion. Two entries must be made into the Schedule: (1) to use Procomm to make the call to CompuServe® to collect the raw site data, and (2) to start Access and import the parsed data. The execution of Procomm will also cause POM to execute and parse the data.

Start the Scheduler program, and create a Schedule entry to execute Procomm. For Program, enter a full path to the Procomm executable "Pw3.exe". Use the Procomm Plus button to create an Automatic Connection, with the arbitrarily named directory as the Connection Directory, and ensure that the arbitrarily named Directory Entry is selected from the dropdown list of entry names as the entry to process. Then set this Schedule entry to execute at an arbitrary time and frequency.

Using similar methods, create a Schedule entry to execute Access. For Program, enter a full path to the Access executable "Msaccess.exe". For Arguments, enter the file name of the arbitrarily named database Meterrdr.Mdb followed by a space, a /X and then the name of the DAR macro—i.e. the full argument would be: "METERRDR.MDB /XDAR". Then set this Schedule entry to execute at a time just after the time (e.g. 10 minutes later) used for the Procomm entry, with a corresponding frequency.

Directions for Initializing an AMR

The following section provides instructions for initializing a working Automatic Meter Reader after the hardware components have been assembled. Refer to the Ampro documentation for details of how to perform these activities, including the cabling requirements to connect an available PC to the AMR's CoreModule CPU board. As described in the Ampro documentation, the CPU board contains a Configuration EEPROM, and certain values, e.g. the Serial Number and initialization date, must be written to this EEPROM after the AMR has been assembled. The programs that the AMR executes must also be loaded onto the DiskOnChip, according to the procedures described in the Ampro documentation. These programs consist of Ampro's Setup.Com, the AMR program Mtrrdr, the initialization program Initrdr and an Autoexec.Bat file, simply used to start the Mtrrdr program under DR-DOS whenever power is applied to the AMR.

Using the hardware setup and instructions as described in the Ampro documentation, and a communications program such as the DOS shareware version of Procomm, establish communications between the PC and the CPU board. Use Ampro's Setup program to set the date and time to be correct, and verify that the CPU board has a configuration that is correct for the hardware of this AMR, using procedures described in the Ampro documentation. Then execute the program Initrdr, which sets certain EEPROM values for use by the AMR software. The source code Initrdr.C is included in the microfiche appendix to this specification. The command to run this program consists of the program name, followed by any specific configuration parameters. The minimal command, which would set the serial number of this unit to NNNN, and set all other parameters to defaults, would be: "INITRDR S=NNNN P=0". Details concerning other possible configurations, that are not applicable to this specification, are available from Jenney Systems Associates, Limited upon request.

The arrangements of the invention as illustrated in FIGS. 1, 2 and 3 have the advantage of a substantial reduction of cost and manufacture in large volumes, and greater reliability as a result of minimal circuit interconnections. The use of industry standard hardware and software components makes both the DAR and the plurality of AMRs highly reliable for use in actual application, with easy replacement of the hardware, and the potential to upgrade the software components to newer and more powerful and efficient versions as additional requirements are imposed.

It will be understood that modifications and variations may be effected without departing from the spirit and scope of the novel concepts of this invention.

What is claimed is:

1. An apparatus for measuring use of a commodity and for transmitting said measurement over a global computer information network to a remote location, comprising:
   a data acquisition and reporting device; and,
   an automatic meter reading device operatively arranged to measure use of said commodity and transmit said measurement over said global computer information network to said data acquisition and reporting device, wherein said automatic meter reading device is a personal computer comprising:
   means for detecting and counting pulses from a meter, which pulses correspond to usage of said commodity;
   means for converting said counted pulses into data corresponding to measured usage of said commodity; and,
   means for transmitting said data via said global computer information network.

2. An apparatus as recited in claim 1 wherein said transmission of measurement is done automatically.

3. An apparatus as recited in claim 1 wherein said measured commodity is electricity.

4. An apparatus as recited in claim 1 wherein said measured commodity is gas.

5. An apparatus as recited in claim 1 wherein said measured commodity is water.

6. An apparatus as recited in claim 1 wherein said measured commodity is steam.

7. An apparatus as recited in claim 1 wherein said automatic meter reading device is operatively arranged to automatically transmit said measurements via said global computer information network at one or more preset times.

8. An apparatus as recited in claim 1 wherein said data acquisition and reporting device comprises:
   means for connecting to said global computer information network; and, means for acquiring commodity measurement data from said global computer information network.

9. An apparatus as recited in claim 8 wherein said data acquisition and reporting device further comprises means for processing and storing said commodity measurement data.

10. An apparatus as recited in claim 1 wherein said means for transmitting comprises means for transmitting said data by e-mail messaging.

11. An apparatus as recited in claim 1 wherein said means for transmitting comprises means for transmitting said data by sending data files directly from said automatic meter reader to said data acquisition device via the global computer information network.

* * * * *